United States Patent [19]
Chinen

[11] Patent Number: 5,812,982
[45] Date of Patent: Sep. 22, 1998

[54] DIGITAL DATA ENCODING APPARATUS AND METHOD THEREOF

[75] Inventor: Toru Chinen, Tokyo, Japan

[73] Assignee: Nippon Steel Corporation, Tokyo, Japan

[21] Appl. No.: 697,728

[22] Filed: Aug. 29, 1996

[30] Foreign Application Priority Data

Aug. 31, 1995 [JP] Japan .................................. 7-246952

[51] Int. Cl.$^6$ .................................. G10L 9/14; G10L 9/16
[52] U.S. Cl. ...................... 704/229; 704/230; 704/219; 704/500; 704/501
[58] Field of Search .................................. 395/2.28, 2.38, 395/2.39, 2.91–2.95

[56] References Cited

U.S. PATENT DOCUMENTS

| | | | |
|---|---|---|---|
| 5,294,925 | 3/1994 | Akagiri | 341/50 |
| 5,369,724 | 11/1994 | Lim | 395/2.15 |
| 5,394,508 | 2/1995 | Lim | 395/2.38 |
| 5,625,746 | 4/1997 | Lim | 395/2.38 |
| 5,642,111 | 6/1997 | Akagiri | 341/50 |

OTHER PUBLICATIONS

Chen et al. "Sub–Band Coding of Audio Using Recursively Indexed Quantization." Applications of Signal Processing to Audio and Acoustics, 00, 1995.

Furui et al., Advances in Speech Signal Processing, Marcel Dekker, Inc., pp. 109–141, 1991.

Princen et al., Analysis/Synthesis Filter Bank Design Based On Time Domain Aliasing Cancellation, IEEE Transaction on Acoustic, Speech, and Signal Processing, ASSP–34, No. 5, pp. 1153–1161, Oct.1986.

*Primary Examiner*—Allen R. MacDonald
*Assistant Examiner*—Alphonso A. Collins
*Attorney, Agent, or Firm*—Pollock, Vande Sande & Priddy

[57] ABSTRACT

Digital data divided into blocks each having a predetermined number of samples is transformed into data on a frequency axis for each block to generate coefficient data for each frequency. Coefficient data of a predetermined number of blocks are stored in a buffer. From the buffer, coefficient data are inputted to a floating-point transforming circuit for each one block. The coefficient data are divided into a plurality of sub-bands, each sub-band including one or a plurality of coefficient data. The coefficient data are floating-point transformed for each sub-band and transformed into one sub-band common characteristic data which is common to the coefficient data included in each sub-band and mantissa data of the number equal to the number of coefficient data included in each sub-band. The sub-band common characteristic data and the mantissa data are stored in a memory. Sub-band common characteristic data of a predetermined number of blocks are read from the memory for each sub-band. One block-common characteristic data which is common to the read sub-band common characteristic data is generated. Coefficient data of a predetermined number of blocks are read from the memory for each sub-band. The read coefficient data is divided by an exponent expressed by the block-common characteristic data to generate new mantissa data.

12 Claims, 2 Drawing Sheets

DIGITAL DATA ENCODING APPARATUS AND METHOD THEREOF

BACKGROUND OF THE INVENTION

1. Field of the Invention

The present invention relates to a digital data encoding apparatus and a method thereof, and relates more particularly to a digital data encoding apparatus for encoding digital audio data in high efficiency and a method thereof.

2. Description of the Related Art

As high-efficiency encoding methods for compressing information content of audio data, there are a sub-band coding method for encoding audio data by dividing the audio data into a plurality of sub-bands on a time axis, and a transform coding method for encoding audio data by transforming the audio data into data on a frequency axis by an orthogonal transformation and then by dividing the transformed data into a plurality of sub-bands. There is also a high-efficiency encoding method, which combines the above two methods, for encoding audio data by dividing the audio data into a plurality of sub-bands on a time axis and then transforming each sub-band signal into data on a frequency axis by an orthogonal transformation.

As one example, a transform coding method which uses MDCT (Modified Discrete Cosine Transform) will be explained below.

Digital audio data to be coded is divided into blocks, for every 512 samples, so that the latter half data of the preceding block becomes the same as the first half data of the current block, that is, the so-called 50% overlap processing is carried out. Further, digital audio data is windowed (weighted) for each block.

Digital audio data divided into blocks is transformed into 256 modified discrete cosine transform coefficient data (that is, data on a frequency axis) by a modified discrete cosine transform for each block. The modified discrete cosine transform coefficient data will hereinafter be called MDCT coefficient data.

Each of the 256 MDCT coefficient data is transformed into characteristic data and mantissa data through a floating-point transformation. However, for data compression, only low-frequency 240 MDCT coefficient data are floating-point transformed. In this case, the low-frequency 240 MDCT coefficient data are divided into a plurality of sub-bands, each sub-band including one or a plurality of MDCT coefficient data, and the MDCT coefficient data is transformed into one characteristic data (sub-band common characteristic data) and at least one mantissa data in each one sub-band.

The mantissa data is transformed into mantissa quantization data including bits of which number is equal to a quantization bit length that has been determined based on sub-band common characteristic data. In other words, when the mantissa data is "1100101" and the determined quantization bit length is "4", for example, the mantissa data "1100101" is transformed into mantissa quantization data "1100" which includes only four bits ("11100") from MSB. The sub-band common characteristic data and the mantissa quantization data are stored in a recording medium and/or transmitted through a transmission path.

According to the above-described transform coding method, however, since the sub-band common characteristic data and the mantissa quantization data are generated for each block, there is still room for improving the efficiency of data compression when there is a large correlation in the sub-band common characteristic data between blocks, for example.

SUMMARY OF THE INVENTION

It is an object of the present invention to provide a digital data encoding apparatus which can encode digital data in high efficiency and a method thereof.

A first digital data encoding apparatus according to the present invention is a digital data encoding apparatus for encoding digital data that is divided into blocks each having a predetermined number of samples, including:

a coefficient data generating unit for generating coefficient data for each frequency by transforming the digital data into data on a frequency axis for each block;

a buffer for storing the coefficient data of a predetermined number of blocks;

a floating-point transforming unit for inputting the coefficient data for each one block from he buffer, dividing the inputted coefficient data into a plurality of sub-bands, each sub-band including one or a plurality of the inputted coefficient data, and floating-point transforming the divided coefficient data for each of the sub-bands to transform the divided coefficient data into one sub-band common characteristic data which is common to the divided coefficient data included in each of the sub-bands and mantissa data of which number is equal to the number of the divided coefficient data included in each of the sub-bands; and a memory for storing the sub-band common characteristic data and the mantissa data, wherein
the floating-point transforming unit
reads the sub-band common characteristic data of the predetermined number of blocks from the memory for each of the sub-bands to generate one block-common characteristic data which is common to the read sub-band common characteristic data, and
reads the coefficient data of the predetermined number of blocks from the memory for each of the sub-bands to generate new mantissa data by dividing the read coefficient data by an exponent expressed by the block-common characteristic data.

A second digital data encoding apparatus according to the present invention is a digital data encoding apparatus for encoding digital data that is divided into blocks each having a predetermined number of samples, including:

a coefficient data generating unit for generating coefficient data for each frequency by transforming the digital data into data on a frequency axis for each block;

a buffer for storing the coefficient data of a predetermined number of blocks;

a floating-point transforming unit for inputting the coefficient data for each one block from the buffer, dividing the inputted coefficient data into a plurality of sub-bands, each sub-band including one or a plurality of the inputted coefficient data, and floating-point transforming the divided coefficient data for each of the sub-bands to transform the divided coefficient data into one sub-band common characteristic data which is common to the divided coefficient data included in each of the sub-bands and mantissa data of which number is equal to the number of the divided coefficient data included in each of the sub-bands; and a memory for storing the sub-band common characteristic data and the mantissa data, wherein
the floating-point transforming unit
reads the sub-band common characteristic data of the predetermined number of blocks from the memory for each of the sub-bands to generate one block-common characteristic data which is common to the read sub-band common characteristic data, and reads the coefficient data of the predetermined number of blocks from the memory for each of the sub-bands only when at least one of differences between the generated block-common characteristic data and the read sub-band common characteristic data for the predetermined number of blocks is smaller than a predetermined value, to generate new mantissa data by dividing the read coefficient data by an exponent expressed by the block-common characteristic data.

A first digital data encoding method according to the present invention is a digital data encoding method for encoding digital data that is divided into blocks each having a predetermined number of samples, including:

a step for generating coefficient data for each frequency by transforming the digital data into data on a frequency axis for each block;

a step for storing the coefficient data of a predetermined number of blocks into a buffer;

a step for inputting the coefficient data for each one block from the buffer, dividing the inputted coefficient data into a plurality of sub-bands, each sub-band including one or a plurality of the inputted coefficient data, and floating-point transforming the divided coefficient data for each of the sub-bands to transform the divided coefficient data into one sub-band common characteristic data which is common to the divided coefficient data included in each of the sub-bands and mantissa data of which number is equal to the number of the divided coefficient data included in each of the sub-bands;

a step for storing the sub-band common characteristic data and the mantissa data into a memory;

a step for reading the sub-band common characteristic data of the predetermined number of blocks from the memory for each of the sub-bands and generating one block-common characteristic data which is common to the read sub-band common characteristic data; and a step for reading the coefficient data of the predetermined number of blocks from the memory for each of the sub-bands to generate new mantissa data by dividing the read coefficient data by an exponent expressed by the block-common characteristic data.

A second digital data encoding method according to the present invention is a digital data encoding method for encoding digital data that is divided into blocks each having a predetermined number of samples, including:

a step for generating a coefficient data for each frequency by transforming the digital data into data on a frequency axis for each block;

a step for storing the coefficient data of a predetermined number of blocks into a buffer;

a step for inputting the coefficient data for each one block from the buffer, dividing the inputted coefficient data into a plurality of sub-bands, each sub-band including one or a plurality of the inputted coefficient data, and floating-point transforming the divided coefficient data for each of the sub-bands to transform the divided coefficient data into one sub-band common characteristic data which is common to the divided coefficient data included in each of the sub-bands and mantissa data of which number is equal to the number of the divided coefficient data included in each of the sub-bands;

a step for storing the sub-band common characteristic data and the mantissa data into a memory;

a step for reading the sub-band common characteristic data of the predetermined number of blocks from the memory for each of the sub-bands to generate one block-common characteristic data which is common to the read sub-band common characteristic data; and a step for reading the coefficient data of the predetermined number of blocks from the memory for each of the sub-bands only when at least one of differences between the generated block-common characteristic data and the read sub-band common characteristic data for the predetermined number of blocks is smaller than a predetermined value, to generate new mantissa data by dividing the read coefficient data by an exponent expressed by the block-common characteristic data.

DESCRIPTION OF THE PREFERRED EMBODIMENTS

Figure 1:
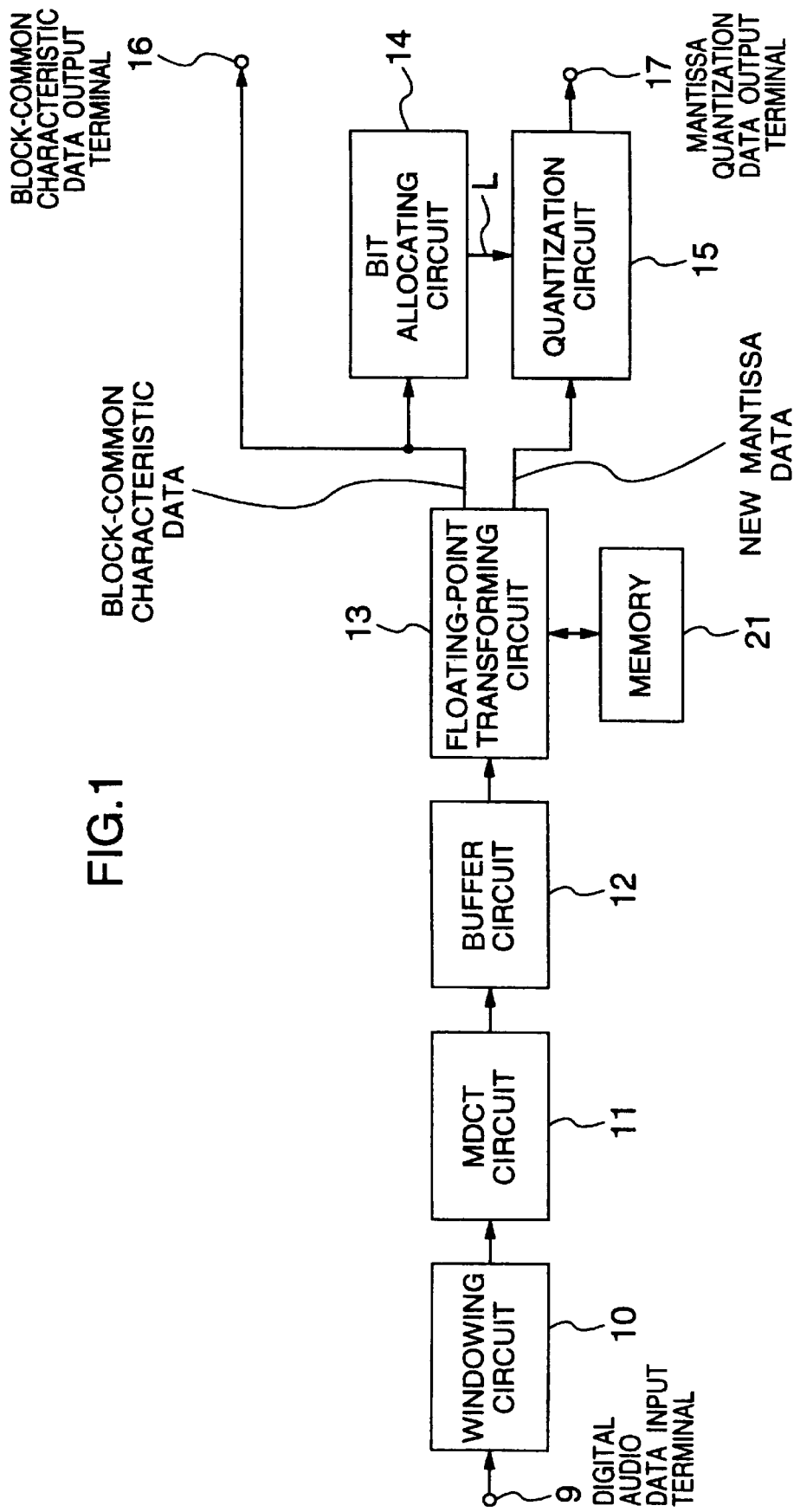
FIG. 1 is a block diagram for showing a digital audio data encoding apparatus according to a first embodiment of the digital data encoding apparatus of the present invention.

As shown in FIG. 1, a digital audio data encoding apparatus according to the first embodiment of the digital data encoding apparatus of the present invention has a digital audio data input terminal 9, a windowing circuit 10, a modified discrete cosine transform circuit 11 (hereinafter to be referred to as an "MDCT circuit 11"), a buffer circuit 12, a floating-point transforming circuit 13, a memory 21, a bit allocating circuit 14, a quantization circuit 15, a block-common characteristic data output terminal 16 and a mantissa quantization data output terminal 17.

Digital audio data is inputted to the digital audio data input terminal 9 from a compact disk player (CDP), for example. The digital audio data is divided into blocks for every 512 samples in the windowing circuit 10. In this case, the digital audio data is divided into blocks so that the latter half data of the preceding block becomes the same as the first half data of the current block, that is, the so-called 50% overlap processing is carried out. Further, the digital audio data is windowed (or weighted) for each block in the windowing circuit 10.

The windowed digital audio data is transformed into 256 MDCT coefficient data (that is, data on the frequency axis) by being modified discrete cosine transformed for each block in the MDCT circuit 11. MDCT coefficient data outputted from the MDCT circuit 11 is held by the buffer circuit 12. However, since high-frequency MDCT coefficient data among the 256 MDCT coefficient data are not particularly necessary, only 240 low-frequency MDCT coefficient data are held in the buffer circuit 12. MDCT coefficient data for three blocks are held in the buffer circuit 12. The MDCT coefficient data held in the buffer circuit 12 is expressed as MDCT[n][i], where n (n=0, 1, 2) represents the number of the blocks and i (i=0, 1, 2, . . ., 239) represents the frequency. Here, n=2 represents a block held for the first time in the buffer circuit 12 and n=0 represents a block held last in the buffer circuit 12. And, i=0 represents a zero frequency, and the frequency is higher when i is larger.

The MDCT coefficient data held in the buffer circuit 12 is inputted to the floating-point transforming circuit 13 for each block and is then floating-point transformed. The floating-point transform processing is carried out as follows.

Figure 2:
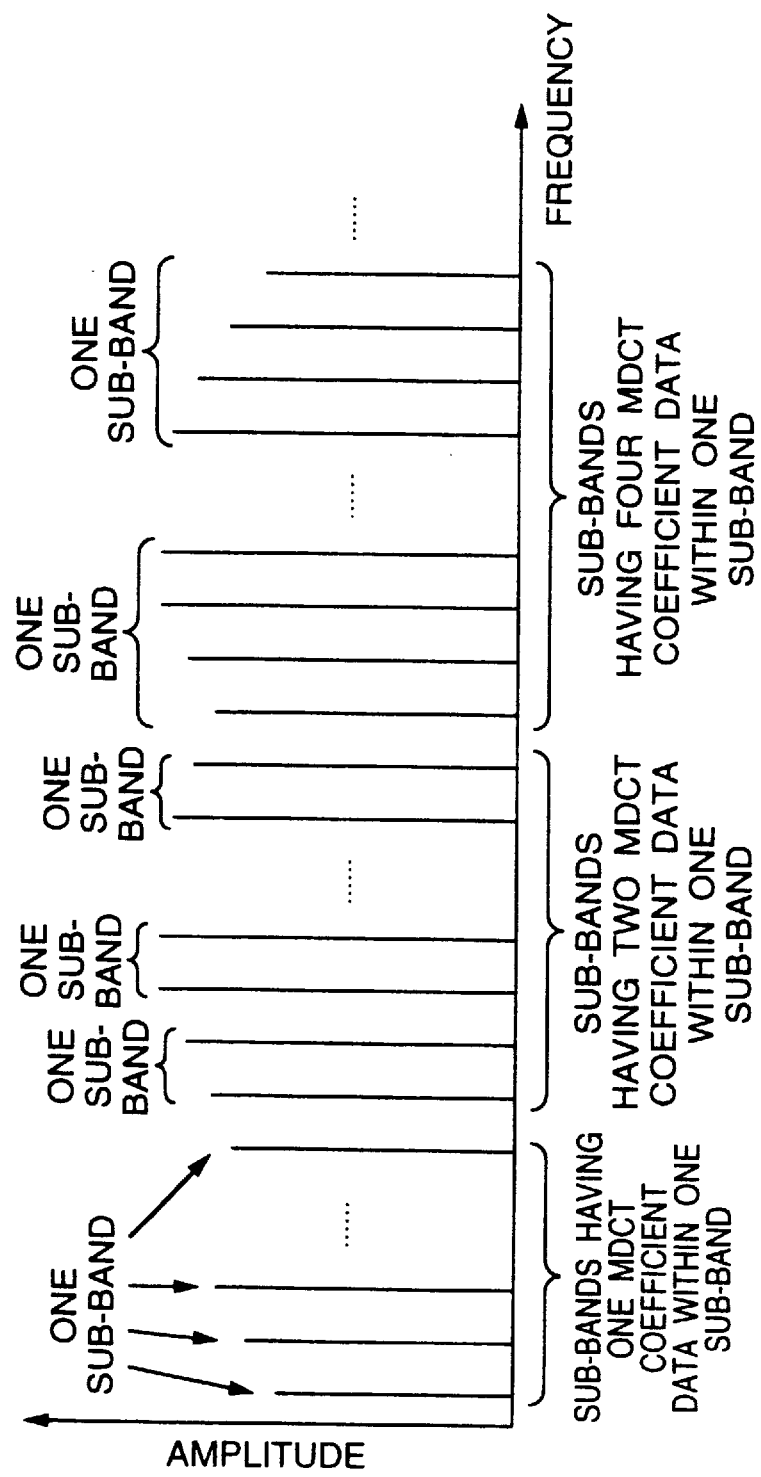
FIG. 2 is a diagram for explaining sub-bands.

(a) As shown in FIG. 2, the 240 MDCT coefficient data are divided into 16 sub-bands, each one sub-band including one MDCT coefficient data, 16 sub-bands, each one sub-band including two MDCT coefficient data, 16 sub-bands, each one sub-band including four MDCT coefficient data and 16 sub-bands, each one sub-band including eight MDCT coefficient data.

(b) For the 16 sub-bands, each one sub-band including one MDCT coefficient data, each MDCT coefficient data is floating-point transform processed directly and is transformed into one characteristic data and one mantissa data. The obtained characteristic data and the mantissa data are stored in the memory 21.

(c) For the rest of the sub-bands, MDCT coefficient data of which absolute value is the largest among a plurality of MDCT coefficient data existing in each one sub-band is detected. Each detected MDCT coefficient data is transformed into floating-point data F which is expressed by the following expression (1).

$$F = M \times 2^{-N} \qquad (1)$$

where,

M: mantissa data; $0.5 \leq M < 1$, $-1 \leq M < -0.5$

N: characteristic data; N is a positive integer.

Other MDCT coefficient data existing in each one sub-band are divided by the mantissa $2^{-N}$ of the floating-point data F, and the quotient becomes the mantissa data. As a result, for each one sub-band, one characteristic data N (sub-band common characteristic data) and mantissa data M of which number is equal to the number of the MDCT coefficient data existing in each one sub-band are calculated. The sub-band common characteristic data and the mantissa data that have been obtained are stored in the memory 21.

When the number of blocks is represented by n (n=0, 1, 2) and the number of sub-bands is represented by k (k=0, 1, 2, . . ., 63), the sub-band common characteristic data of the MDCT coefficient data that have been floating-point transform processed as described above can be expressed as MEXP[n][k]. In this case, k=0 represents a sub-band which includes a zero frequency (i=0), and when k is larger this shows a sub-band including a higher frequency.

Next, the characteristic data common to the three blocks (block-common characteristic data) is generated in the following manner. The sub-band common characteristic data MEXP[n][k] of the MDC coefficient data of the three blocks stored in the memory 21 are read for each sub-band, and sub-band common characteristic data MEXP[n][k] having the smallest value is set as block-common characteristic data CMEXP[k] in each sub-band. To be more specific, for the first sub-band k=0, the sub-band common characteristic data MEXP[0][0], MEXP[1][0] and MEXP[2][0] of the MDC coefficient data of the three blocks are read from the memory 21. When the sub-band common characteristic data MEXP[2][0] is the smallest value among the three sub-band common characteristic data MEXP[0][0], MEXP[1][0] and MEXP[2][0], the sub-band common characteristic data MEXP[2][0] of the smallest value is set as the block-common characteristic data CMEXP[0] in this sub-band k=0.

Next, the mantissa data of the MDCT coefficient data of the three blocks are recalculated as follows by using the block-common characteristic data CMEXP[k]. When new mantissa data is expressed as MAN[n][i] (n=0, 1, 2; i=0, 1, 2, . . . , 239), the new mantissa data MAN[n][i] is obtained by the following expression.

$$MAN[n][i] = MDCT[n][i]/2^{-CMEXP[k]} \qquad (2)$$

In other words, for the first sub-band k=0, new mantissa data MAN[0][0], MAN[1][0] and MAN[2][0] are obtained by using the MDCT coefficient data MDCT[0][0], MDCT[1][0] and MDCT[2][0] of this sub-band and the block-common characteristic data CMEXP[0] of this sub-band.

$$MAN[0][0] = MDCT[0][0]/2^{-CMEXP[0]}$$
$$MAN[1][0] = MDCT[1][0]/2^{-CMEXP[0]} \qquad (3)$$
$$MAN[2][0] = MDCT[2][0]/2^{-CMEXP[0]}$$

Since sub-band common characteristic data MEXP[n][k] having the smallest value is set as the block-common characteristic data CMEXP[k] among the sub-band common characteristic data MEXP[n][k] of the MDCT coefficient data of the three blocks, the new mantissa data MAN[n][i] obtained from the expression (2) cannot become a value equal to or above one or a value less than −1.

In the bit allocating circuit 14, a quantization bit length L of the mantissa data is determined by utilizing human hearing masking characteristics or the like, using the block-common characteristic data CMEXP[k] inputted from the floating-point transforming circuit 13. The determined quantization bit length L is inputted to the quantization circuit 15.

In the quantization circuit 15, the new mantissa data MAN[n][i] inputted from the floating-point transforming circuit 13 is transformed into mantissa quantization data each including bits, of which number is equal to the quantization bit length L, from MSB. In this case, since the block-common characteristic data CMEXP[k] is common to the three blocks as described above, the quantization bit length L is also used common to the three blocks. To be more specific, when the new mantissa data MAN[0][0] MAN[1][0] and MAN[2][0] of the three blocks in the first sub-band k=0 are "1100", "0010" and "1001" respectively and the determined quantization bit length L is "2", for example, the new mantissa data MAN[0][0], MAN[1][0] and MAN[2][0] are transformed into mantissa quantization data "11", "00" and "10" each having only a two-bit length from MSBs respectively.

The block-common characteristic data CMEXP[k] outputted from the floating-point transforming circuit 13 is outputted from the block-common characteristic data output terminal 16 to the outside, and the mantissa quantization data outputted from the quantization circuit 15 is outputted from the mantissa quantization data output terminal 17 to the outside. The block-common characteristic data CMEXP[k] and the mantissa quantization data are stored in a recording medium and/or transmitted through a transmission path.

A digital audio data encoding apparatus according to the second embodiment of the digital data encoding apparatus of the present invention will be explained next.

According to the above-described digital audio data encoding apparatus of the first embodiment, it is possible to reduce the information content (data compression) by generating block-common characteristic data CMEXP[k]. However, when there is a large difference between the block-common characteristic data CMEXP[k] and the sub-band common characteristic data MEXP[n][k], the value of new mantissa data MAN[n][i] obtained from the above-described expression (2) could become close to zero. In this case, since each of the mantissa quantization data generated by the quantization circuit 15 is made to have only a bit number of the quantization bit length L from the MSB of the new mantissa data MAN[n][i], a quantization error becomes larger when the value of the new mantissa data MAN[n][i] is close to zero.

In order to avoid such an increase in the quantization error, according to the digital audio data encoding apparatus of the present embodiment, when a difference between the block-common characteristic data CMEXP[k] and the sub-band common characteristic data MEXP[n][k] is larger than a predetermined value, the three sub-band common characteristic data MEXP[0][k], MEXP[1][k] and MEXP[2][k] are used as they are without generating the block-common characteristic data CMEXP[k]. The above-described predetermined value is obtained as follows.

For each of the three blocks, a square-sum S[n] of the MDCT coefficient data MDCT[n][i] is obtained from the following expression.

$$S[n] = \sum_{i=0}^{239} (MDCT[n][i] \times MDCT[n][i]) \quad (4)$$

Then, an average value AS of the square-sums S[0], S[1] and S[2] of the three blocks is obtained from the following expression.

$$AS = \sum_{n=0}^{2} S[n]/3 \quad (5)$$

Then, a ratio RS[n] of the square-sum S[n] of the three blocks to the average value AS is obtained from the following expression.

$$RS[n] = S[n]/AS \quad (6)$$

When at least one of the three ratios RS[n] obtained has a value equal to or above 256 or a value not larger than $1/256$, the three sub-band common characteristic data MEXP[0][k], MEXP[1][k] and MEXP[2][k] are used as they are without generating the block-common characteristic data CMEXP[k].

In the above example, when at least one of the average values of the MDCT coefficient data MDCT[n][i] of the three blocks is equal to or above 16 times or not larger than $1/16$ times of the average value of the MDCT coefficient data MDCT[n][i] for the total three blocks, the three sub-band common characteristic data MEXP[0][k], MEXP[1][k] and MEXP[2][k] are used as they are without generating the block-common characteristic data CMEXP[k]. The numeral of 16 corresponds to 4 in terms of the characteristic data, and this means that the characteristic data in each block has a difference of an average at least 4 from the block-common characteristic data CMEXP[k].

Further, in the above example, when at least one of the three ratios S[n] has a value equal to or above 256 or a value not larger than $1/256$, the three sub-band common characteristic data MEXP[0][k], MEXP[1][k] and MEXP[2][k] are used as they are without generating the block-common characteristic data CMEXP[k]. If a quantization error of the mantissa data becomes larger or when the reproduction sound quality at the decoder side is deteriorated under this condition, a value smaller than 256 is used. On the other hand, when sufficient reproduction sound quality is obtained at the decoder side, a value larger than 256 is used.

In the above explanation, although the floating-point data F is shown as $M \times 2^{-N}$ in the expression (1), this may also be expressed as $M \times r^{-N}$ (where, r is an integer of at least 3). Although digital audio data is encoded for every three blocks in the above explanation, the data can also be encoded for every two or four or more blocks. Further, although block-common characteristic data is generated for each sub-band, the block-common characteristic data may also be generated for each sample. Further, although digital audio data is encoded, other digital data can also be encoded.

What is claimed is:

1. A digital data encoding apparatus for encoding digital data that is divided into blocks each having a predetermined number of samples, including:

coefficient data generating means for generating coefficient data for each frequency by transforming said digital data into data on a frequency axis for each block;

a buffer for storing said coefficient data of a predetermined number of blocks;

floating-point transforming means for inputting said coefficient data for each one block from said buffer, dividing said inputted coefficient data into a plurality of sub-bands, each sub-band including one or a plurality of said inputted coefficient data, and floating-point transforming said divided coefficient data for each of said sub-bands to transform said divided coefficient data into one sub-band common characteristic data which is common to said divided coefficient data included in each of said sub-bands and mantissa data of which number is equal to the number of said divided coefficient data included in each of said sub-bands; and a memory for storing said sub-band common characteristic data and said mantissa data, wherein said floating-point transforming means reads said sub-band common characteristic data of said predetermined number of blocks from said memory for each of said sub-bands to generate one block-common characteristic data which is common to said read sub-band common characteristic data, and reads said coefficient data of said predetermined number of blocks from said memory for each of said sub-bands to generate new mantissa data by dividing said read coefficient data by an exponent expressed by said block-common characteristic data.

2. A digital data encoding apparatus according to claim 1, wherein said digital data is digital audio data, and said coefficient data generating means generates said coefficient data for each frequency by modified discrete cosine transforming said digital data for each block.

3. A digital data encoding apparatus according to claim 1, wherein said floating-point transforming means divides said inputted coefficient data so that a sub-band of a larger frequency includes more coefficient data.

4. A digital data encoding apparatus for encoding digital data that is divided into blocks each having a predetermined number of samples, including:

coefficient data generating means for generating coefficient data for each frequency by transforming said digital data into data on a frequency axis for each block;

a buffer for storing said coefficient data of a predetermined number of blocks;

floating-point transforming means for inputting said coefficient data for each one block from said buffer, dividing said inputted coefficient data into a plurality of sub-bands, each sub-band including one or a plurality of said inputted coefficient data, and floating-point transforming said divided coefficient data for each of said sub-bands to transform said divided coefficient data into one sub-band common characteristic data which is common to said divided coefficient data included in each of said sub-bands and mantissa data of which number is equal to the number of said divided coefficient data included in each of said sub-bands; and a memory for storing said sub-band common characteristic data and said mantissa data, wherein said floating-point transforming means reads said sub-band common characteristic data of said predetermined number of blocks from said memory for each of said sub-bands to generate one block-common characteristic data which is common to said read sub-band common characteristic data, and reads said coefficient data of said predetermined number of blocks from said memory for each of said sub-bands only when at least one of differences between said generated block-common characteristic data and said read sub-band common characteristic data for said predetermined number of blocks is smaller than a predetermined value, to generate new mantissa data by dividing said read coefficient data by an exponent expressed by said block-common characteristic data.

5. A digital data encoding apparatus according to claim 4, wherein said digital data is digital audio data, and said coefficient data generating means generates said coefficient data for each frequency by modified discrete cosine transforming said digital data for each block.

6. A digital data encoding apparatus according to claim 4, wherein said floating-point transforming means divides said inputted coefficient data so that a sub-band of a larger frequency includes more coefficient data.

7. A digital data encoding method for encoding digital data that is divided into blocks each having a predetermined number of samples, including:

a step for generating coefficient data for each frequency by transforming said digital data into data on a frequency axis for each block;

a step for storing said coefficient data of a predetermined number of blocks into a buffer;

a step for inputting said coefficient data for each one block from said buffer, dividing said inputted coefficient data into a plurality of sub-bands, each sub-band including one or a plurality of said inputted coefficient data, and floating-point transforming said divided coefficient data for each of said sub-bands to transform said divided coefficient data into one sub-band common characteristic data which is common to said divided coefficient data included in each of said sub-bands and mantissa data of which number is equal to the number of said divided coefficient data included in each of said sub-bands;

a step for storing said sub-band common characteristic data and said mantissa data into a memory;

a step for reading said sub-band common characteristic data of said predetermined number of blocks from said memory for each of said sub-bands to generate one block-common characteristic data which is common to said read sub-band common characteristic data; and a step for reading said coefficient data of said predetermined number of blocks from said memory for each of said sub-bands to generate new mantissa data by dividing said read coefficient data by an exponent expressed by said block-common characteristic data.

8. A digital data encoding method according to claim 7, wherein said digital data is digital audio data, and said coefficient data generating step generates said coefficient data for each frequency by modified discrete cosine transforming said digital data for each block.

9. A digital data encoding method according to claim 7, wherein said transforming step divides said inputted coefficient data so that a sub-band of a larger frequency includes more coefficient data.

10. A digital data encoding method for encoding digital data that is divided into blocks each having a predetermined number of samples, including:

a step for generating coefficient data for each frequency by transforming said digital data into data on a frequency axis for each block;

a step for storing said coefficient data of a predetermined number of blocks into a buffer;

a step for inputting said coefficient data for each one block from said buffer, dividing said inputted coefficient data into a plurality of sub-bands, each sub-band including one or a plurality of said inputted coefficient data, and floating-point transforming said divided coefficient data for each of said sub-bands to transform said divided coefficient data into one sub-band common characteristic data which is common to said divided coefficient data included in each of said sub-bands and mantissa data of which number is equal to the number of said divided coefficient data included in each of said sub-bands;

a step for storing said sub-band common characteristic data and said mantissa data into a memory;

a step for reading said sub-band common characteristic data of said predetermined number of blocks from said memory for each of said sub-bands to generate one block-common characteristic data which is common to said read sub-band common characteristic data; and a step for reading said coefficient data of said predetermined number of blocks from said memory for each of said sub-bands only when at least one of differences between said generated block-common characteristic data and said read sub-band common characteristic data for said predetermined number of blocks is smaller than a predetermined value, to generate new mantissa data by dividing said read coefficient data by an exponent expressed by said block-common characteristic data.

11. A digital data encoding method according to claim 10, wherein said digital data is digital audio data, and said coefficient data generating step generates said coefficient data for each frequency by modified discrete cosine transforming said digital data for each block.

12. A digital data encoding method according to claim 10, wherein said transforming step divides said inputted coefficient data so that a sub-band of a larger frequency includes more coefficient data.

* * * * *